UNITED STATES PATENT OFFICE.

RAYMOND C. BENNER AND HARRY F. FRENCH, OF FREMONT, OHIO, ASSIGNORS TO NATIONAL CARBON COMPANY, INC., A CORPORATION OF NEW YORK.

ELECTRIC BATTERY.

1,316,761.      Specification of Letters Patent.     Patented Sept. 23, 1919.

No Drawing.     Application filed March 30, 1918.    Serial No. 225,693.

*To all whom it may concern:*

Be it known that we, RAYMOND C. BENNER and HARRY F. FRENCH, citizens of the United States, and residents, respectively, of Fremont, in the county of Sandusky and State of Ohio, and Fremont, in the county of Sandusky and State of Ohio, have invented a certain new and useful Improvement in Electric Batteries, of which the following is a full, clear, and exact description.

This invention relates to a process for making depolarizers for electric batteries.

In our application filed July 13, 1916, Serial No. 109,050, we disclosed the fact that sulfur can be heated with copper oxid to form a solid block, the sulfur acting as the binder. As disclosed in that application, the sulfur, in addition to the binding action, has the peculiar property of raising the voltage of the copper oxid cell, that is, a cell having electrodes of zinc and copper oxid and an electrolyte of sodium hydroxid or its equivalent. The melting point of sulfur is below 125° C., and in the process described in our prior application it was not heated higher than this temperature.

We have discovered that the peculiar voltage raising property of sulfur in the copper oxid cell is more pronounced when the mix is heated at temperatures higher than this.

When sulfur and copper oxid are heated together the raise in voltage increases with the temperature, until in the neighborhood of 140° a maximum is reached which remains substantially constant up to a temperature of 180°. From 180° to about 230° the voltage effect of the sulfur decreases slowly, but from then on it diminishes more rapidly until at 385° the effect is practically nil. That is, if copper oxid and sulfur are heated to 385° or higher, and placed as a depolarizer in the alkaline cell referred to, after being cooled to ordinary temperature, the voltage will not be much higher than if copper oxid alone had been used as a depolarizer.

We have also found that heating for a prolonged period at a certain temperature has somewhat the same effect as heating for a less time at a higher temperature.

We have obtained good results with as low as 0.2% of sulfur and have used as high as 40% with substantially the same effect. In general, the best results are obtained by heating from 1 to 10% sulfur with copper oxid for seven or eight hours at 140° C. to one-half to one hour at 180° C. The mixture may be heated to temperatures between 140° and 180° with practically maximum effect, and the time of heating would vary accordingly.

The time of heating required to secure maximum effect will depend also upon the thoroughness with which the mixture is stirred. The more thorough the stirring, the less time required.

Having described our invention, what we claim is:

1. The process of making a battery depolarizer which consists in mixing copper oxid and sulfur and heating the mixture between 125° C. and 385° C.

2. The process of making a battery depolarizer which consists in mixing copper oxid and sulfur and heating the mixture between 140° C. and 180° C.

3. A battery depolarizer consisting of a mixture of copper oxid and sulfur heated between 125° C. and 385° C. and cooled to normal temperature.

In testimony whereof, we hereunto affix our signatures.

RAYMOND C. BENNER.
HARRY F. FRENCH.